United States Patent [19]

Bingham et al.

[11] Patent Number: 5,557,790
[45] Date of Patent: Sep. 17, 1996

[54] FACILITY FOR THE GENERIC STORAGE AND MANAGEMENT OF MULTIMEDIA OBJECTS

[75] Inventors: Ronald E. Bingham, Capitola; Michael J. Dockter, Hollister; Joel F. Farber, San Jose, all of Calif.; Kevin D. Seppi, Austin, Tex.

[73] Assignee: International Business Machines Corp., Armonk, N.Y.

[21] Appl. No.: 263,146

[22] Filed: Jun. 21, 1994

[51] Int. Cl.⁶ .................................................. G06F 17/30
[52] U.S. Cl. .................................... 395/600; 364/DIG. 1; 364/282.1; 364/282.4
[58] Field of Search ................. 395/200.03, 200.09, 395/200.18, 500, 600, 650

[56] References Cited

U.S. PATENT DOCUMENTS

| | | | |
|---|---|---|---|
| 4,905,163 | 2/1990 | Garber et al. | 395/600 |
| 4,914,586 | 4/1990 | Swinehart et al. | 395/600 |
| 4,930,071 | 5/1990 | Tou et al. | 395/600 |
| 5,202,982 | 4/1993 | Gramlich et al. | 395/600 |
| 5,214,780 | 5/1993 | Ingoglia et al. | 395/600 |
| 5,257,369 | 10/1993 | Skeen et al. | 395/650 |
| 5,278,978 | 1/1994 | Demers et al. | 395/600 |
| 5,423,038 | 6/1995 | Davis | 395/650 |
| 5,438,509 | 8/1995 | Heffron | 364/408 |
| 5,440,744 | 8/1995 | Jacobson et al. | 395/650 |
| 5,446,880 | 8/1995 | Balgeman | 395/600 |

FOREIGN PATENT DOCUMENTS

| | | | |
|---|---|---|---|
| 467591 | 1/1992 | European Pat. Off. | 15/40 |
| 501770 | 2/1992 | European Pat. Off. | 15/419 |
| 483576 | 5/1992 | European Pat. Off. | 15/40 |
| 483577 | 5/1992 | European Pat. Off. | 15/40 |
| 10913 | 9/1990 | WIPO | 15/419 |

OTHER PUBLICATIONS 7.0 Appendix A. Related Industry Acticles / Data, 7.1 Hypertext Requirements.

*Primary Examiner*—Thomas G. Black
*Assistant Examiner*—John C. Loomis
*Attorney, Agent, or Firm*—Randy W. Lacasse; Marilyn S. Dawkins; David J. Kappos

[57] ABSTRACT

A computer server for storing and managing a digitized generic form of multiple heterogeneously formatted data objects (e.g. multi-media files). The system uniquely identifies both the generic form of the data and a description relating the stored generic form to the original formatted data. Through the management of the unique identifiers a requester need only specify an identifier to quickly access a data object regardless of platform incongruencies, particular stored format, location or addressing structure (i.e. particular file path). Once identified and located the generic data object form is transformed into a format usable by the requestor.

24 Claims, 5 Drawing Sheets

FACILITY FOR THE GENERIC STORAGE AND MANAGEMENT OF MULTIMEDIA OBJECTS

BACKGROUND OF THE INVENTION

1. Field of Invention

The present invention relates to the storage and management of information objects including multi-media data. More specifically, the present invention provides for a system which allows information objects to be stored generically and not in their final presentation version—that which the end user interacts with.

2. Related Materials and Definitions

This application is related to the following applications which are hereby incorporated by reference:
UNIVERSAL TAG IDENTIFIER ARCHITECTURE (application Ser. No. 07/963,885, now U.S. Pat. No. 5,414,841),
METHOD FOR GENERATING CONNECTIONS BETWEEN OBJECTS IN A COMPUTER NETWORK (Grinding) (application Ser. No. 08,262,999),
FACILITY FOR THE INTELLIGENT SELECTION OF INFORMATION OBJECTS (PERSONA) (application Ser. No. 08/262,834),
METHOD FOR ASSOCIATION OF HETEROGENEOUS INFORMATION (application Ser. No. 08/262,838),
FACILITY FOR THE STORAGE AND MANAGEMENT OF CONNECTIONS (CONNECTION SERVER) (application Ser. No. 08/267,022),
METHOD FOR STORING AND RETRIEVING HETEROGENEOUS CLASSIFICATION SYSTEMS (application Ser. No. 08/263,379), The following definitions may be helpful to the understanding of the terminology as cited throughout the above related materials.

This terminology may be used throughout the background, specification and claims of the present invention:

Tags: Tags are globally unique identifiers. Tags are sequentially numbered identifiers identifying data objects (i.e. video, text, audio, observations, opinions, etc.)

Phenomena: The logical structure of the system begins with a unit of human perception, the "phenomena". In the universe of a computer system, "Phenomena" is defined as a representation of phenomena which exist in the universe of human experience. Phenomena can be ideas, written matter, video, computer data, etc. Examples include viewing a computer file using a word processor, watching a digital video clip or listening to a digital audio segment.

Connections: That which gathers (or links) Phenomena into interrelated collections. Connections are that which lead the user from one Phenomena to another Phenomena. Connections are not simply a road-map from a Phenomena to all other Phenomena. More specifically, Connections represent an observation of related Phenomena made by human or by computer observers.

Connection Attributes: In the logical structure of the system, "Connection Attributes" allow the entire network of Phenomena and Connections to become usable to each user of the system. Connection Attributes store the rationale behind each connection. In fairly generic terms, Connection Attributes describe the Who, What, Where, When and Why of a particular observation.

Noumena: The concept of the present invention, Noumena are that which lie beyond the realm of human perception. In computer-based systems, such as the instant invention, they are the computer stored data, examples are "computer files" or "datasets". When these computer files, the Noumena, are observed in their "raw" form, they do not resemble pictures, sounds, nor words. These Noumena resemble a series of bits, bytes, or numbers. These computer files must be manipulated by computer programs, "Phenominated", to become as they appear to the observer. In the present system, Noumena are all of the generic format computer files needed to produce a representation of a Phenomena. This includes the computer data files as well as the computer program files.

Grinding: Grinding is a systematic, computer-based observation of Phenomena. This is typically done with a "narrow view". The programs are usually looking for well defined criteria. When Phenomena are observed by the computer programs, the programs make Connections between the observed Phenomena and other Phenomena known by the programs. In effect, acting as a human observer would when viewing a Phenomena and manually Connection it to other Phenomena.

Persona: to determine the value of information based on each user's subjective preferences.

Capture: During knowledge capture, the human or computer observer Connects two Phenomena and provides the rationale for the Connection by supplying Connection Attributes. The user can also Connect a new Phenomena to previously existing Phenomena.

Retrieve: During knowledge retrieval, an observer navigates from Phenomena to Phenomena via Connections. Knowledge is delivered by experiencing the reconstituted Phenomena. Which knowledge is delivered is controlled by the Connections and the assessment of the Connection Attributes, preferably under the auspices of a Persona.

The present invention supports the overall system of copending application "FACILITY FOR THE ASSOCIATION OF HETEROGENEOUS OBJECTS". It supports the TAG ARCHITECTURE, CONNECTION SERVER, GRINDING and the design and infrastructure of the overall system, but is not limited thereto.

The term "Noumena" could be read "object", and the term "Connection" could be read "link" in this disclosure. The distinction between Noumena and Phenomena is made to distinguish between objects as experienced by users (Phenomena) and objects as they are actually stored (Noumena).

Prior Art

In the prior art, typically a data object is stored in the form of which it came. An audio recording would be stored as a series of tone generations, a video as a series of pixels (assuming a digitized signal) and text in the format of its originating word processor. In addition, storage and accessing of a data object typically requires a complex process of data object locator schemes in conjunction with associated recognition of data file directory structures. The present invention provides for storage and management of computerized data sources as a generic series of data which when retrieved is filtered through the appropriate output formatter (i.e. tone generator). The data objects are accessed using a unique identifier to directly access the data regardless of storage format or location (i.e. locally or remotely across networks).

Objects of the Invention

It is an object of the present invention to store data objects as efficiently as possible.

It is also an object of the present invention to store a generic form of data objects.

It is also an object of the present invention to access stored data objects as quickly as possible.

It is also an object of the present invention to reduce duplicate storage of multiple versions of data objects.

It is also an object of the present invention to allow for simplified access to data objects regardless of location.

SUMMARY OF THE INVENTION

The present invention, hereafter Noumena Server, provides the physical Noumena storage and management to support the general purpose storage and management of large multimedia objects as well as traditional data objects. This disclosure describes the operations, algorithms, interfaces, protocols, structures and database schema that operate on and manage Noumena. In the preferred embodiment these are the underlying primitives which are the descriptions of knowledge in the co-pending FACILITY FOR THE ASSOCIATION OF HETEROGENEOUS OBJECTS.

Facilities are provided to identify, locate, manage and deliver multimedia information on a universal scale. Meta-data describing the physical and logical relationships involving the Noumena are maintained as they are migrated or replicated in a distributed environment of heterogeneous computers.

Noumena may be comprised of parts, for example: a movie is made up of parts, an audio track, a video track, etc. Each of these parts may in turn be digitized and recorded in one or more computer files. Each of these files can be called Noumenon.

The present invention provides a method and apparatus for efficiently storing and managing Noumenon in their generic digitized format with the removal of duplicates. Location and retrieval of these generic formats requires the usage of unique identifiers eliminating the need for extensive directory and file addressing techniques.

DETAIL DESCRIPTION OF THE INVENTION

Figure 1:
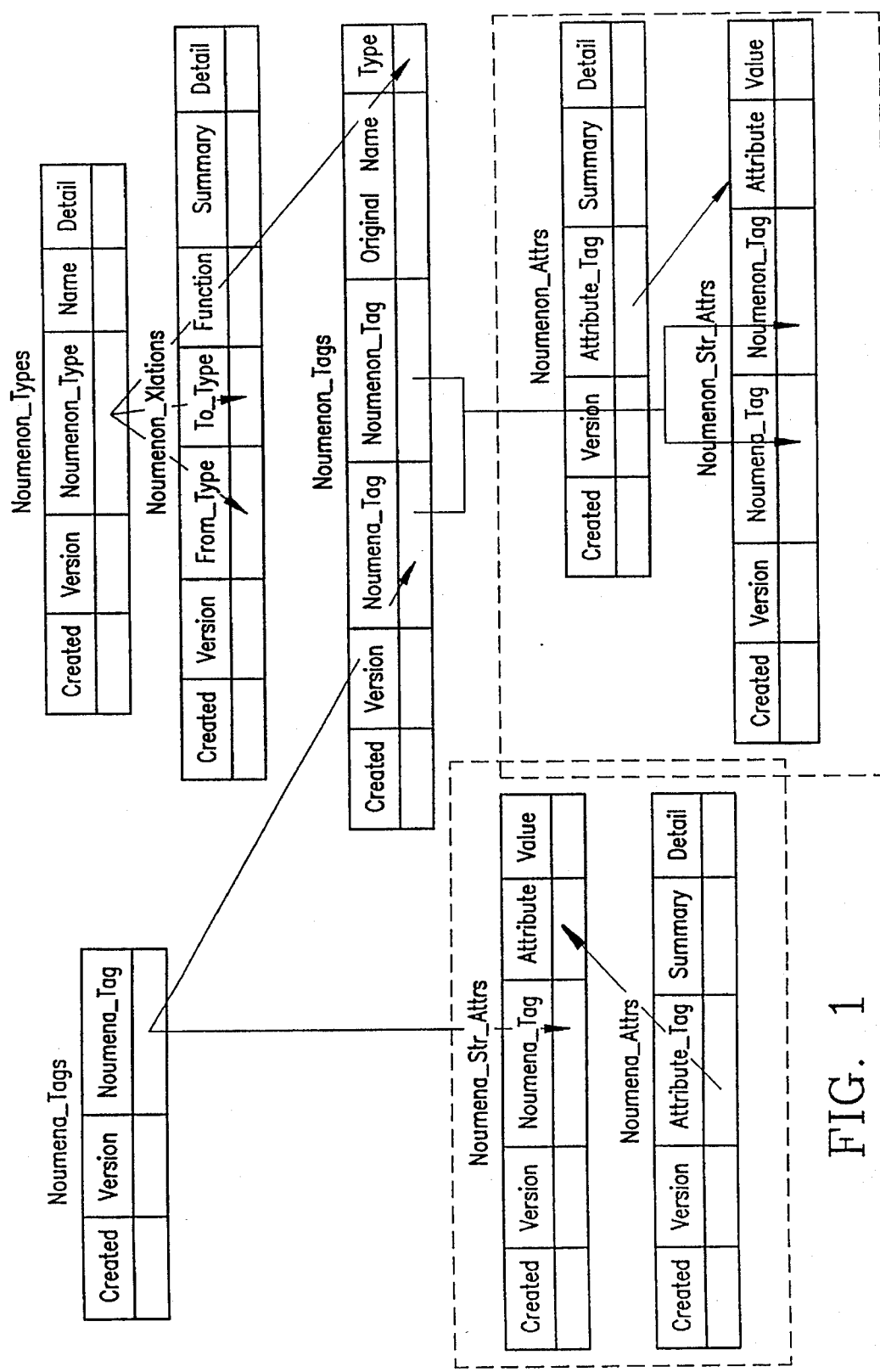
FIG. 1 illustrates the basic database schema of the present invention.
Figure 2A:
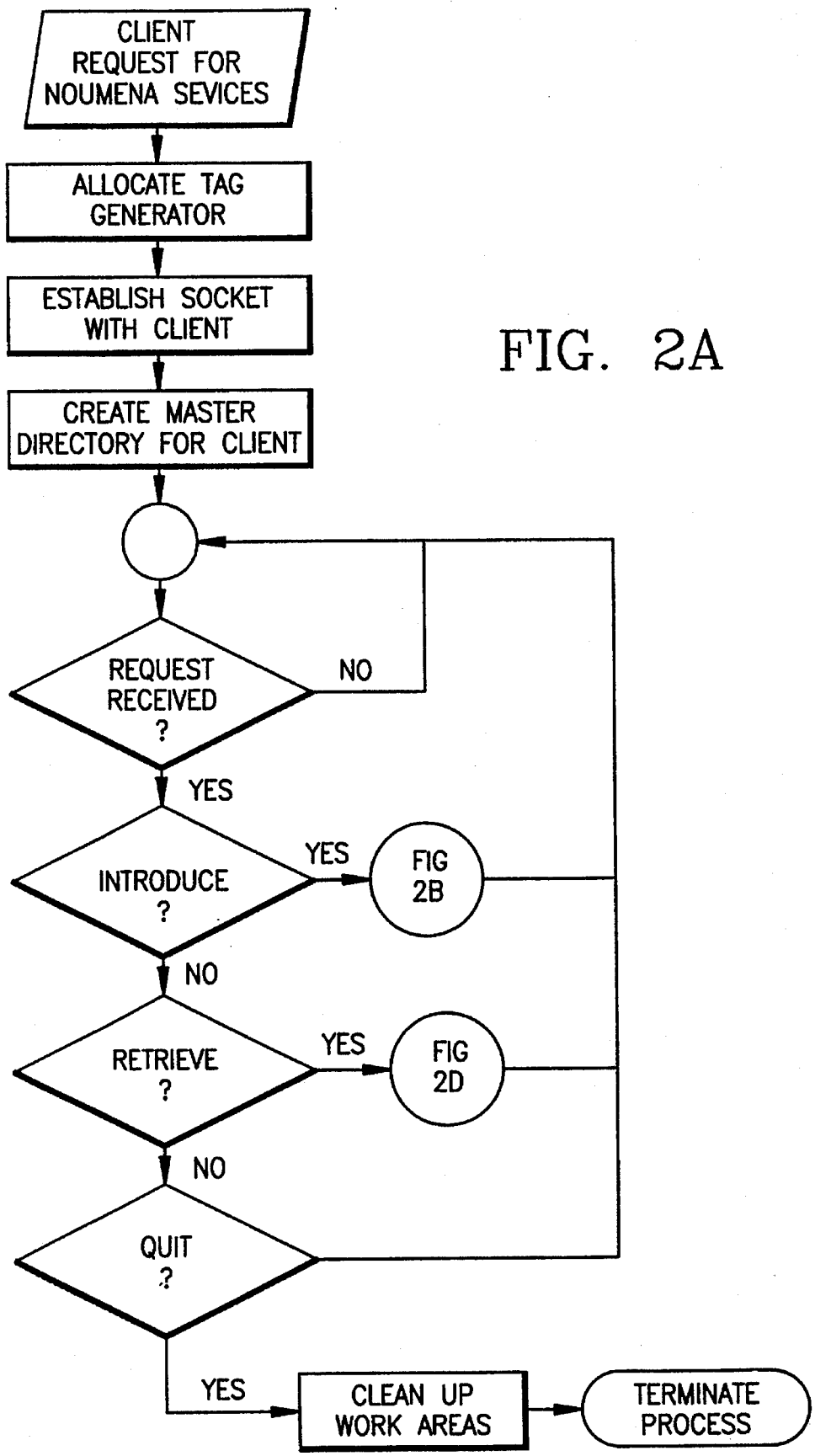
FIGS. 2A, 2B, 2C and 2D collectively illustrate a flow diagram of the present invention.
Figures 2B, 2C:
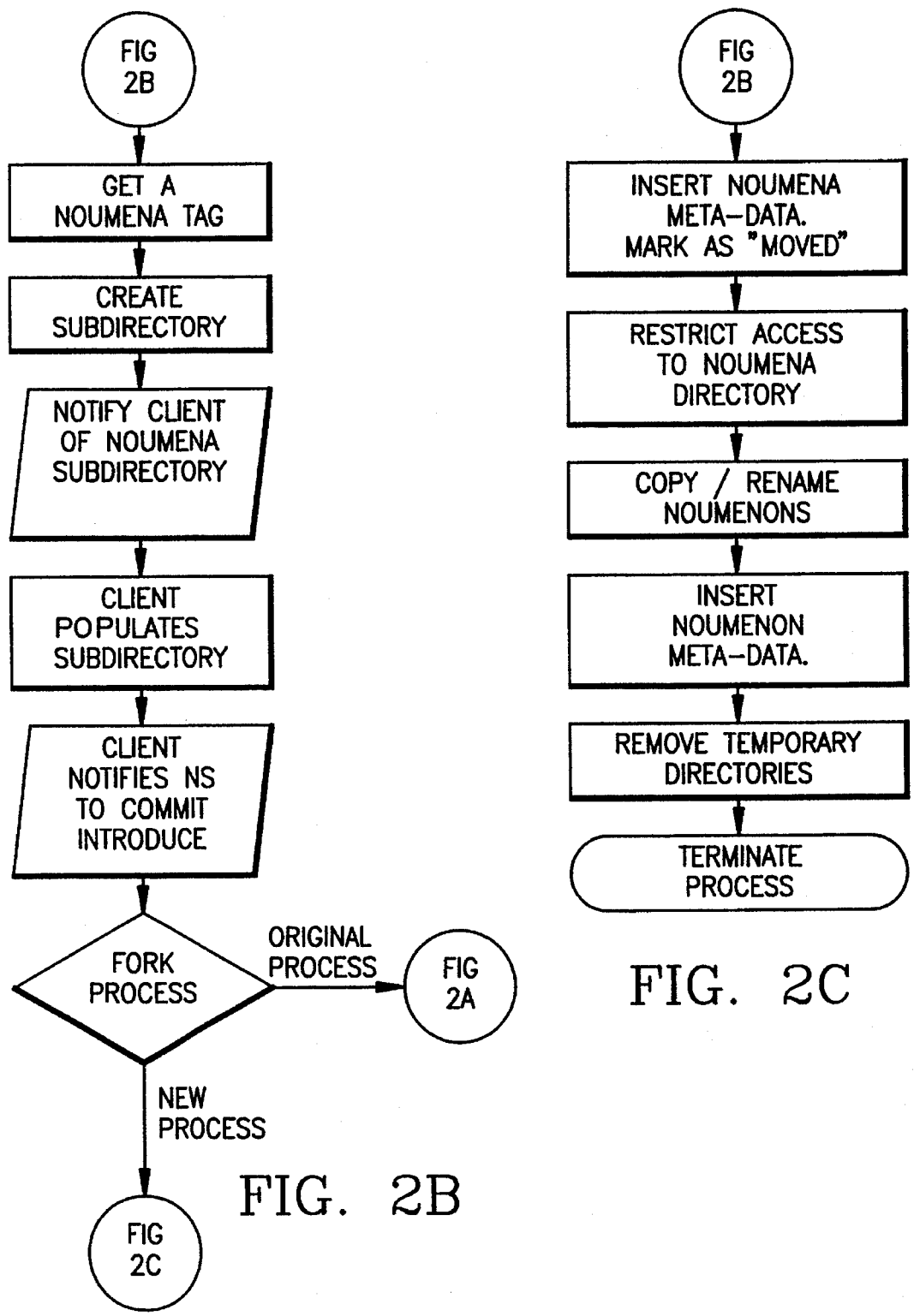
Figure 2D:
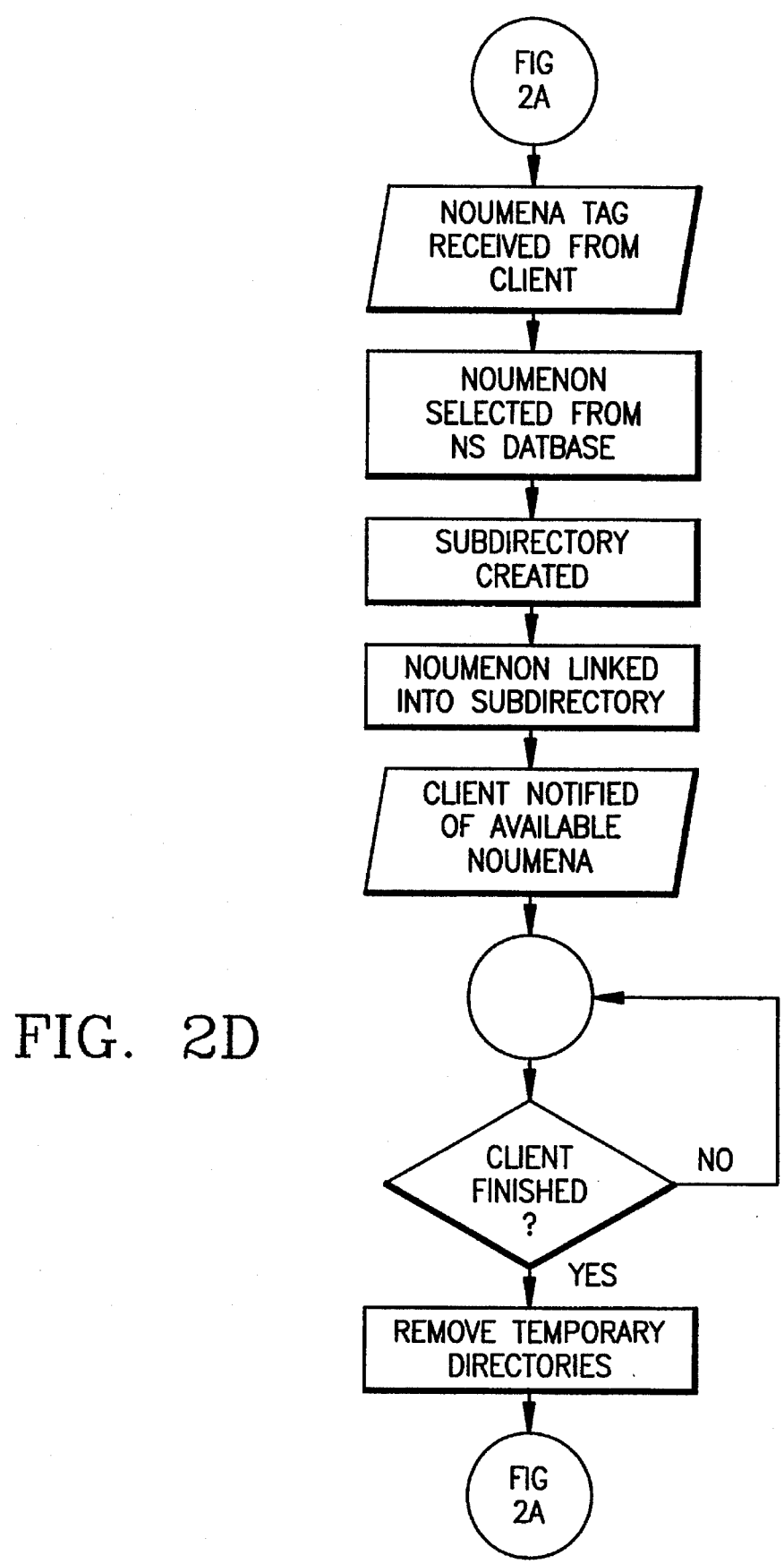
Figure 3:
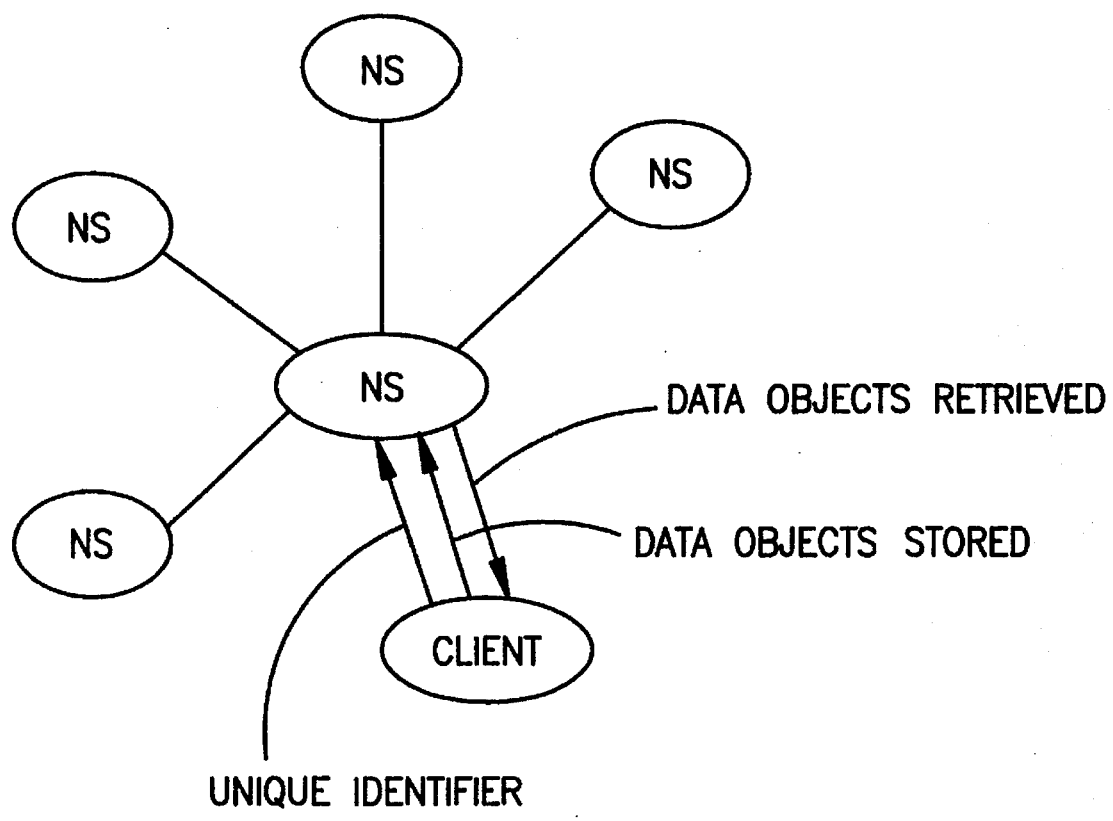
FIG. 3 illustrates a parallel broadcast of a Noumena request to multiple Noumena servers.

FIG. 1 is a graphical representation depicting the organization, relationships and data structures comprising the Noumena Server.
Notes:
This description uses SQL and Relational Database Management System terminology. However, there is no dependency on or restriction to a relational database for implementation.

To illustrate the usage of the database schema, the relationships to an instance of the Classification System data structures are shown. They are labeled clearly and are NOT part of the Noumena Server Database schema.

The arrows in the diagram represent integrity constraints between the substructures.

A "version" field is provided in all sub-structures to support future versions of the data structures.

A "created" field is provided to time-stamp to creation of all entries into the logical model in all sub-structures.
Operations_ and Facilities of the Noumena Server This section describes the basic set of operations or services defined on the stored multimedia objects. The purpose and nature of the facilities will be described on a per operation basis.

All operations are atomic in nature. Either all changes are remembered or they are all forgotten (committed or rolled back). No partial changes persist.
Introduce Noumena All Noumena, physically managed by the Noumena Server must be INTRODUCED. This operation consists of:

The requestor obtains a work area identified by a token from the Noumena Server. The requestor populates the Noumena Server work area with files and designates the set of files to be persistently stored as Noumenon for the Noumena. The Noumena Server obtains and stores the designated files, and updates appropriate meta-data with a recording of the physical characteristics, location and existence of the Noumena and all associated Noumenon. Therefore, the Noumena_Tags, Noumenon_Tags, Noumena_Str_Attrs, Noumenon_Str_Attrs, and potentially other related attribute sub-structures are updated.

The Noumena Server returns a unique identifier to the requestor as an identifier for this set of files. This identifier may be the token given above to identify the work area. This Tag representing the Noumena is stored in Noumena_Tags.

In the Noumenon_Tags, meta-data including the Tag of the Noumena, the Tag of each Noumenon, the original name of the object, and its "storage" type are recorded (which may differ from its original form).

In Noumena_Str_Attrs, Noumenon_Str_Attrs, as well as other attribute substructures, miscellaneous attribute meta-data such as location qualification, ownership and path information are recorded.

The stored physical format for a Noumenon may be transformed for the purpose of optimization. Possible optimization include: physical storage size, target platforms, transmission overhead, normalization, minimization of total cost.
Retrieve Noumena The RETRIEVE NOUMENA operation accepts Tags or other information that uniquely identifies a Noumena as input and returns a set of files for the Noumena, a collection of Noumenon. These references were recorded in the Noumenon_Tags and the Noumenon substructures.

Translation from the stored physical format to the desired target maybe performed as necessary.

Noumenon maybe directly accessed by the client (read-only), this may reduce the need to make copies. This may be desirable from a cost perspective since less data is moved. Additionally, in this mode the client can control the pace, the size of the piece accessed, and whether the entire Noumenon is retrieved.
Unintroduce Noumena Noumena can be UNINTRODUCED. This operation is the removing of the physical characteristics, location and existence of the Noumena and all associated Noumenon. These references were recorded in the Noumena_Tags, Noumenon_Tags and their substructures. This is not a general use function and is intended only for exceptional operational needs.

Noumena Server supports the co-pending METHOD FOR ASSOCIATION OF HETEROGENEOUS INFORMATION system including the Tag Architecture, Grinding and the Classification system, etc. This Noumena Server can also be used independent of the co-pending METHOD FOR ASSOCIATION OF HETEROGENEOUS INFORMATION system as a general purpose multimedia object storage facility.

The Noumena Server uses a "Coat check model". When a Noumena is introduced to the Noumena Server a globally unique identifier, e.g. a Tag, is returned to the client. Only this Tag is required for future access (even Noumena has been migrated, archived, translated . . . ). This model provides transparent access to remotely stored Noumena.

The Noumena Server provides very efficient Noumena/Noumenon storage. The Noumena Server minimizes Noumenon movement by allowing direct user read access to the Noumena (instead of moving or replicating) when security and other requirements are satisfied.

Hierarchical storage management can be employed for migration of Noumenon through various media for performance and cost considerations.

The Noumena Server allows efficient handling of redundancy. Noumenon introduced redundantly may be reduced to a single copy referenced by potentially many Noumena. This reduction may be implemented as an asynchronous process.

Architecturally, Noumena Servers may cooperate M-to-N with Connection Servers. The system design allows structural independence of most processes enabling exploitation of computers that may be loosely coupled, multi-threaded and/or support parallel processing.

The instances of the Noumena Server may be deployed as a single location (node) or as a network (distributed) of connected locations (nodes).

The Noumena Server can choose optimal data formats for storage and presentation of each platform. This choice is based on defaults derived from an evaluation of the physical hardware/software configuration and the customer policy, which can be overridden by the customer. This output is independent of the stored format. Translation of the output is performed if necessary. This is new in this type of system, and increases the number of systems suitable to used with the Noumena Server.

Alternatives:

Initially, descriptions of Noumenon were stored with the Noumenon. Now descriptions of Noumenon are stored separately. This supports the concept that a Noumenon may be a part of more then one Noumena.

Tags are references in this disclosure. Any globally unique token could be substituted.

DESCRIPTION OF THE PREFERRED EMBODIMENTS

The following discussion illustrates an implementation of a Noumena Server. After this material, the detailed database schema is presented. "Noumena Server" will be abbreviated "NS" in this example.

Subject information objects are called Noumena. The components of a Noumena are Noumenon. Noumenon are generally manifested as files. This NS uses client-server architecture. The NS takes requests from client machines and either stores information on behalf of the client or returns information to the client. In this NS embodiment the communication is via "TCI/IP sockets" (with optional KEREBEROS security). Sets of files are communicated as directories.

1. The NS, upon request from the client, establishes the following services on behalf of the client:
   a) A Tag generator server is allocated to provide Tags as needed.
   b) A TCP/IP socket is established with the NS database.
2. The client requests a temporary "master directory" structure including read and write subdirectories. The master directory is created with a unique name. The two subdirectories created under the master directory are "R", for read-only access, and "W" for read-write access. "W" is used for the client to "introduce" new information. "R" is used for the NS to provide information to the client. Separate directories allow the separation of authorizations for additional security. These security considerations are above and beyond the normal security provided by the operating system and should provide additional security.
3. The NS makes the directories accessible (mountable) by the client. Until this point no access can take place by the clients to server data. After making the directories mountable the NS notifies the client of their existence.
4. The NS now waits upon a client request.
5. The NS. upon request from the client for the "Introduce" function uses the following path:
   a. The NS gets a new "Tag" for the Noumena from the local Tag Server.
   b. The NS creates a new subdirectory. It is inserted under the write subdirectory previously created. It is name using the Tag just obtained.
   c. After creating the subdirectory (STEP 5b) the NS notifies the client of its existence and it name.
   d. The NS now waits for the client to put it s Noumena into the subdirectory created in STEP 5b.
   e. Upon notification by the client the NS gets a list, from the client, of Noumenon created in the (STEP 5b) subdirectory and the corresponding data formats.
   f. When the client is finished creating Noumena it sends a message to the NS to commit "Introduce".
   g. The client can now create additional Noumena with their set of Noumenon following STEPS 5a through 5f.
   h. The NS processes the commit request from the client. The first step of Commit is to insert the Noumena meta-data into the NS database, then marking the Noumena as 'MOVED'.
   i. For integrity control the Noumena directory is now made accessible only by NS processes.
   j. The NS now gets Tags from the Tag generator for each of the new Noumenon under its control.
   k. The Noumena Server compares the data format of each Noumenon obtained in step e to a list of preferred data formats for the corresponding data type. If the formats match, the server moves the files (Noumenon) from the temporary subdirectory to the Noumena directory with the Noumenaon Tag names. If the data formats differ, a format translation routine is invoked to translate the given format to the preferred format and move the data to the Noumena directory.
   l. The NS now causes the insert of the Noumenon Tag name, the original name, and the file type into the NS database.
   m. The server removes the temporary directories created in STEP 5b.
   n. The NS processing of the request is now complete.
6. The NS, upon request from the client for the "Retrieve" function uses the following path:
   a. A client requests a Noumena from the NS, this Noumena is identified by a Tag.
   b. The NS requests list of Noumenon from the NS database for this Noumena.
   c. The NS creates a new subdirectory. It is inserted under the read subdirectory previously created. It is name using the Noumena Tag form STEP 6a.
   d. The Noumena Server compares the data format of each Noumenon in the requested Noumena to a list of preferred data formats corresponding to the client. If the data formats match, the Noumenon are linked or moved into the subdirectory created in step 6c. If the data formats differ, the Noumenon must be translated before being linked or moved into the subdirectory created in step 6c.

e. the client is notified the requested Noumena are available.

f. The NS waits upon notification that the client is finished.

g. When the client is done with the Noumena, the NS is notified.

h. The NS then removes the temporary directories created in STEP 6b.

i. The NS returns to a wait state pending the next client request.

The NS processing of the request is now complete.

7. When the client notifies the NS that it is finished then the NS marks the client finished. The NS removes the client process and temporary structures after a variable number (5) of minutes have elapsed.

Example SQL Definition of the DB Schema

The following SQL syntax documents the implementation of the structures to support the Noumena Server (also parts of Classification System for completeness). This description uses SQL and Relational Database Management System terminology. However, there is no dependency on or restriction to a relational database for implementation.

More details of the structure and the elements are provided in the block comments in the SQL syntax that follows:

```
------ Noumena Server Database DDL
------ Datatypes:
------     — Created are TIMESTAMP
------     — Tags are varchar (30)
------     — Versions are Tags
------     — Connection Identifiers are Tags
------     — Creators are Tags
------     — Summary's are VARCHAR (50)
------     — Details are VARCHAR (2000)

------ Noumena_Tags table - a collection Tags used to identify coherent
       Noumena.

------ Columns:
------     — Created: Date/Time when a Noumena row was inserted.
------     — Version: Version number of the row format.
------     —Noumena_Tag: Tag used to identify Noumena.
CREATE TABLE Noumena_Tags (
        Created         timestamp       NOT NULL,
        Version         varchar(30)     NOT NULL,
        Noumena_Tag     varchar(30)     NOT NULL,
        PRIMARY KEY (Noumena_Tag)
        );
COMMENT ON TABLE Noumena_Tags IS
        'A collection of Tags used to identify coherent Noumena';
------ CREATE UNIQUE INDEX Noumena_Tags_IX1 ON Tags (
------     Noumena_Tag
------     );

------ Noumenon_Types - a collection of all Noumenon types managed by
       the Noumena Server ------ Columns:
------     — Created: Date/Time when a Noumenon_Types row was inserted.
------     — Version: Version number of the row format.
------     — Noumenon_Type:
------     — Name:
------     — Detail:
CREATE TABLE Noumenon_Types (
        Created         timestamp       NOT NULL,
        Version         varchar(30)     NOT NULL,
        Noumenon_Type   varchar(30)     NOT NULL,
        Name            varchar(50)     NOT NULL,
        Detail          varchar(2000)   NOT NULL,
        PRIMARY KEY (Noumenon_Type)
        );
COMMENT ON TABLE Noumenon_Types IS
        'A collection of all Noumenon Types managed by the
        Noumenator';
------ CREATE, UNIQUE INDEX Noumenon_Types_IX1 ON Noumenon_types (
------     Noumenon_Type
------     );

------ Noumenon_Xlations - a collection of Connections between
       Phenomenon.

------ Columns:
------     — Created: Date/Time when a Connection row was inserted.
```

```
            — Version: Version number of the row format.
            — From_Type:
            — To_Type:
            — Function:
            — Summary:
            — Detail:
CREATE TABLE Noumenon_Xlations (
        Created         timestamp       NOT NULL,
        Version         varchar(30)     NOT NULL,
        From_Type       varchar(30)     NOT NULL,
        To_Type         varchar(30)     NOT NULL,
        Function        varchar(50)     NOT NULL,
        Summary         varchar(50)     NOT NULL,
        Detail          varchar(2000)   NOT NULL,
        PRIMARY KEY (To_Type, From_Type),
        FOREIGN KEY (From_Type) REFERENCES Noumenon_Types ON DELETE
        CASCADE,
        FOREIGN KEY (To_Type) REFERENCES Noumenon_Types ON DELETE
        CASCADE
        );
COMMENT ON TABLE Noumenon_Xlations IS
        'Translation routines from one Noumenon type to another';
        CREATE UNIQUE INDEX Connections_IX1 ON Connections (
        Con_Id
        );
CREATE INDEX Noumenon_X1_IX2 ON Noumenon_Xlations (
        From_Type
        );
CREATE INDEX Noumenon X1_IX3 ON Noumenon_Xlations (
        To_Type
        );

Noumenon_Tags -
        Columns:
            — Created: Date/Time when an Attribute row was inserted.
            — Version: Version number of the row format.
            — Noumena_Tag:
            — Noumenon_Tag:
            — Original_Name:
            — Type:
CREATE TABLE Noumenon_Tags (
        Created         timestamp       NOT NULL,
        Version         varchar(30)     NOT NULL,
        Noumena_Tag     varchar(30)     NOT NULL,
        Noumenon_Tag    varchar(30)     Not Null,
        Original Name   varchar(50)     NOT NULL,
        Type            varchar(30)     NOT NULL,
        PRIMARY KEY (Noumena_Tag, Noumenon_Tag),
        FOREIGN KEY (Noumena_Tag) REFERENCES Noumena_Tags ON DELETE
        CASCADE,
        FOREIGN KEY (Type) REFERENCES Noumenon_Types ON DELETE
        RESTRICT
        );
COMMENT ON TABLE Noumenon_Tags IS 'Description of each attribute
class';
        CREATE UNIQUE INDEX Noumenon_Tag_IX1 ON Noumenon_Tags (
            — Attribute
        );
CREATE INDEX Noumenon_Tag_IX2 ON Noumenon_Tags (
        Noumena_Tag
        );
```

The Noumenon themselves are stored in conventional files, Management of the files within the Noumena Server can be either manual, or automatic based on a hierarchical storage system.

Noumena Server operation can be implemented via SQL (or other high level data manipulation languages) to manipulate the data substructures.

CONCLUSION

A system and method has been shown in the above embodiments for the efficient storage and management of data objects. While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A computer server for the efficient storage and management of a plurality of heterogeneous formatted data objects comprising:

receiving means for receiving at least a first formatted data object;

a first transforming means for transforming said received data object into a generic format;

storage means for storing said generic format data object into computer storage;

globally unique identifier means for uniquely identifying said transformed data object;

descriptor means for storing a description relating said generic format with said originally received data object;

retrieving means for retrieving said generic format of said data object based on a user request of said first formatted data object based on said unique identifier, and a second transforming means to transform said retrieved generic formatted data object into said requested first format.

2. A computer server as per claim 1, wherein said receiving means includes at least a request for allocation of server storage space.

3. A computer server as per claim 1, wherein said first transforming means transforms said at least first formatted data object for optimization of storage.

4. A computer server as per claim 3, wherein said optimization is based on physical storage size.

5. A computer server as per claim 3, wherein said optimization is based on normalization of said first formatted data object.

6. A computer server as per claim 3, wherein said optimization is based on minimization of total cost.

7. A computer server as per claim 3, wherein said optimization is based on a particular target platform 8. A computer server as per claim 3, wherein said optimization is based on transmission overhead.

9. A computer server as per claim 1, wherein said computer storage may be local storage or located remote from said computer server.

10. A computer server as per claim 1, wherein said computer storage may be located across computer networks.

11. A computer server as per claim 1, wherein said unique identifier means further uniquely identifies said description relating said generic format with said originally received data object.

12. A computer server as per claim 11, wherein said description includes an original name of said first data object.

13. A computer server as per claim 1, wherein said computer server further includes an unintroduce means for removing stored generic data objects from said computer server.

14. A computer server as per claim 1, wherein said computer server further comprises a duplicate detection and elimination means for preventing storage of duplicate generic data objects.

15. A computer server for the efficient storage and management of a plurality of heterogeneous formatted data objects across computer networks comprising:

storage access and allocation means for accessing and receiving an allocation of storage space for at least a first formatted data object;

a first transforming means for transforming said received formatted data object into a generic format;

storage means for storing said generic format data object into computer storage;

a first unique identifier means for uniquely identifying said generic format data object;

attribute means for storing a description relating said generic format with said originally received data object;

a second unique identifier means for uniquely identifying said description;

retrieving means for retrieving said generic format of said data object based on a user request of a selected format of said data object using corresponding first and second unique identifiers, and a second transforming means to transform said retrieved generic formatted data object into said selected format.

16. A computer server as per claim 15, wherein said first transforming means transforms said at least first formatted data object for optimization of storage.

17. A computer server as per claim 16, wherein said optimization is based on physical storage size.

18. A computer server as per claim 16, wherein said optimization is based on a particular target platform.

19. A computer server as per claim 16, wherein said optimization is based on transmission overhead.

20. A computer server as per claim 16, wherein said optimization is based on normalization of said at least first formatted data object.

21. A computer server as per claim 16, wherein said optimization is based on minimization of total cost.

22. A computer server as per claim 15, wherein said description includes an original name of said at least first data object.

23. A computer server as per claim 15, wherein said computer server further includes an unintroduce means for removing stored generic data objects from said computer server.

24. A computer server as per claim 15, wherein said computer server further comprises a duplicate detection and elimination means for preventing storage of duplicate generic data objects.

* * * * *

UNITED STATES PATENT AND TRADEMARK OFFICE
CERTIFICATE OF CORRECTION

PATENT NO.  : 5,557,790
DATED       : September 17, 1996
INVENTOR(S) : Bingham et al.

It is certified that error appears in the above-indentified patent and that said Letters Patent is hereby corrected as shown below:

<u>Column 3</u>
   Line 65, after "time-stamp", delete "to" and insert --the--.
   Line 67, after "Operations", delete "_".
<u>Column 5</u>
   Line 39, after "more", delete "then" and insert --than--.
   Line 53, after "embodiment", insert --,--.
<u>Column 6</u>
   Line 11, after "NS", delete "." and insert --,--.
   Line 12, after "function", insert --,--.
   Line 16, after "is", delete "name" and insert --named--.
   Line 19, after "and", delete "it" and insert --its--.
   Line 20, after "put", delete "it s" and insert --its--.
   Line 42, "Noumenaon" should read "Noumenon".

UNITED STATES PATENT AND TRADEMARK OFFICE
CERTIFICATE OF CORRECTION

PATENT NO. : 5,557,790
DATED : September 17, 1996
INVENTOR(S) : Bingham et al.

It is certified that error appears in the above-indentified patent and that said Letters Patent is hereby corrected as shown below:

Column 7

Line 1, after "e.", delete "the" and insert --The--.
Line 12, after "finished", delete "then" and insert --,--.

Signed and Sealed this

Twenty-eighth Day of January, 1997

Attest:

BRUCE LEHMAN

Attesting Officer   Commissioner of Patents and Trademarks